United States Patent
Heinemann

(10) Patent No.: US 12,259,702 B2
(45) Date of Patent: Mar. 25, 2025

(54) SYSTEM AND METHOD FOR ADMINISTRATION OF DRIVE COMPONENTS

(71) Applicant: Siemens Aktiengesellschaft, Munich (DE)

(72) Inventor: Gerhard Heinemann, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 337 days.

(21) Appl. No.: 17/774,392

(22) PCT Filed: Oct. 6, 2020

(86) PCT No.: PCT/EP2020/077930
§ 371 (c)(1),
(2) Date: May 4, 2022

(87) PCT Pub. No.: WO2021/089261
PCT Pub. Date: May 14, 2021

(65) Prior Publication Data
US 2022/0404791 A1    Dec. 22, 2022

(30) Foreign Application Priority Data
Nov. 6, 2019 (EP) .................................... 19207330

(51) Int. Cl.
*G05B 19/05* (2006.01)
*G06F 21/62* (2013.01)

(52) U.S. Cl.
CPC ........... *G05B 19/058* (2013.01); *G06F 21/62* (2013.01); *G06F 2221/2141* (2013.01)

(58) Field of Classification Search
CPC .............. G05B 19/058; G05B 19/042; G05B 19/0423; G05B 2219/23051; G06F 21/62; G06F 2221/2141
See application file for complete search history.

(56) References Cited

U.S. PATENT DOCUMENTS

2003/0131147 A1    7/2003  Wilt et al.
2008/0046546 A1    2/2008  Parmar et al.
(Continued)

FOREIGN PATENT DOCUMENTS

CN    1432913 A    7/2003
CN    101131639 A    2/2008
(Continued)

OTHER PUBLICATIONS

PCT International Search Report and Written Opinion of International Searching Authority mailed Jan. 29, 2021 corresponding to PCT International Application No. PCT/EP2020/077930 filed Oct. 6, 2020.

*Primary Examiner* — Christopher W Carter
(74) *Attorney, Agent, or Firm* — Henry M. Feiereisen LLC

(57) ABSTRACT

A system and method for administration of drive components. The system comprises at least one drive component having a drive computing unit. Drive software for the drive component is stored on and executable by the drive computing unit. The system has a computing unit in communication with the drive computing unit. The computing unit detects an actual operating state of the drive component and the machine and system context to select at least one service operating state for the drive components according to the detected actual operating state. The system comprises a distributed computing system in communication with the drive computing unit which is configured to trigger administration of the drive components according to the selected service operating state of the drive components. A process to be maintained can be defined which ensures that the operation cannot be negatively influenced and people or machinery cannot be endangered during the administration.

11 Claims, 1 Drawing Sheet

(56) References Cited

U.S. PATENT DOCUMENTS

| | | |
|---|---|---|
| 2013/0131833 A1 | 5/2013 | Wettlin et al. |
| 2013/0132057 A1 | 5/2013 | Deng et al. |
| 2013/0173095 A1 | 7/2013 | Sukumaran et al. |
| 2014/0173060 A1 | 6/2014 | Jubran et al. |
| 2014/0282015 A1 | 9/2014 | Nixon et al. |
| 2014/0336791 A1* | 11/2014 | Asenjo ................ G05B 13/026 700/44 |
| 2015/0277399 A1 | 10/2015 | Maturana et al. |
| 2015/0331686 A1 | 11/2015 | Petersen et al. |
| 2016/0274552 A1* | 9/2016 | Strohmenger ......... G06Q 10/06 |
| 2017/0020324 A1 | 1/2017 | Young et al. |
| 2017/0074589 A1 | 3/2017 | Somary et al. |
| 2018/0011465 A1 | 1/2018 | Lo et al. |
| 2019/0072940 A1 | 3/2019 | Schnabel et al. |
| 2019/0250902 A1 | 8/2019 | Tateishi |

FOREIGN PATENT DOCUMENTS

| | | |
|---|---|---|
| CN | 103948755 A | 7/2014 |
| CN | 104024963 A | 9/2014 |
| CN | 104871131 A | 8/2015 |
| CN | 105162887 B | 4/2018 |
| CN | 109683546 A | 4/2019 |
| DE | 10 2015 208 750 A1 | 11/2015 |
| DE | 10 2017 215 508 A1 | 3/2019 |

\* cited by examiner

SYSTEM AND METHOD FOR ADMINISTRATION OF DRIVE COMPONENTS

CROSS-REFERENCES TO RELATED APPLICATIONS

This application Is the U.S. National Stage of International Application No. PCT/EP2020/0777930, filed Oct. 6, 2020, which designated the United States and has been published as International Publication No. WO 2021/089261 A1 and which claims the priority of European Patent Application, Ser. No. 19/207,330.2, filled Nov. 6, 2019, pursuant to 35 U.S.C. 119 (a)-(d).

BACKGROUND OF THE INVENTION

The invention relates to a system for administering drive components. The invention further relates to a method for administering drive components and a computer program.

Drive components, for example electric drives in automated machines, should execute the applications intended for them as independently and reliably as possible. The as-independent-as-possible operation of the drive component can be monitored and analyzed via cloud-based services. Here, cloud-based services represent applications that can be provided via an external IT infrastructure available via the Internet. Further possibilities for cloud-based services include firmware updates for the drive components installed in the machine and the initiation of diagnostic and optimization functions. However, these applications can disrupt the operating sequence of the machine or even cause damage to machinery or people if applications are imported into the machine via the cloud and/or changes are made to existing applications. Here, it is particularly problematic that the complete and current local state, the so-called machine context, of the machine or a drive component of the machine may not be available in the cloud. In particular, information is not always available on the current travel state of the machine or the tool and the machining status of the workplace or as to whether there are people in the access area or operational area of the machine which could possibly lead to collisions between people and machinery. In addition to the unknown machine context, a further complication is that processes, such as, for example, the importing of new applications require authorization by corresponding specialist personnel. Moreover, security risks make it necessary to take high cyber security requirements into account. For the reasons mentioned, such cloud-based interventions in the machine function of automated machines are generally strictly prohibited at present.

In known scenarios, corresponding actions are performed by corresponding specialist personnel who have an overview of the machine context on site at the automated machine and are correspondingly qualified and authorized and hence have, for example, access authorizations to the machine, keys for control cabinets and control panels and knowledge of passwords.

Furthermore, corresponding actions can be executed via remote access. However, this procedure also requires a contact person at the machine to provide information on the current machine context. This contact person has to pass on the necessary information on the machine context to the corresponding operator in charge of the remote access.

The known solutions represent an inefficient way of administering drive components in automated machines since monitoring has to be performed manually and on site and is hence time-consuming and labor-intensive. Moreover, the automated machine and/or corresponding drive components of the machine to be administered have to be monitored and their states communicated.

Furthermore, the automated machine has to be switched to a specific state that allows it to be administered without disruptions and damage to the automated machine. This leads to machine stoppages or downtimes in production and hence reduces the effective usage time.

Therefore, there is a need for a mechanism for administering drive components. Proceeding from the prior art shown and the resulting need, the present invention is tasked with creating a solution that at least partially overcomes the disadvantages known in the prior art.

SUMMARY OF THE INVENTION

This object is achieved by a system for administering drive components and by the independent appended claims, in particular by a method and a computer program.

According to a first aspect, the present invention relates to a system for administering drive components. The system preferably comprises a large number of drive components.

For the purposes of the present invention, administration comprises the technical operation of the drive components and/or the execution of measures for the operation of drive components. In particular, administration comprises the provision of new hardware and/or software functions of the drive component, wherein the hardware functions can be implemented in software.

The drive component comprises a drive computing unit. The drive component can be embodied as an electric drive. The electric drive can comprise a DC drive or an AC drive. The drive computing unit is embodied as a computing unit with a volatile and/or non-volatile memory, at least one processor and communication interfaces for communication with the drive component and/or the same or higher-level components. The drive computing unit can further have communication interfaces for communication with further devices and/or units. In one embodiment, the drive component has a display/operating element for communication with specialist personnel which is connected to the drive computing unit for communication via a communication interface. The communication Interfaces can be embodied for wired and/or wireless communication. In particular, the drive computing unit can be embodied as a converter. The drive computing unit is configured to provide an actuation signal for the drive component that can be varied in terms of voltage, current and/or frequency.

Drive software for operating the drive component that can be executed by the drive computing unit is stored on the drive computing unit. The drive software has a specific software version. Here, a software version represents a defined development stage of the software of the drive component with all associated components. Different versions represent the change and development over a certain period of time of software or parts with a common historical basis. The historical basis comprises the major version. For example, versioning systems can be used to distinguish newer editions or software from older editions. Moreover, the drive software comprises parameters for setting and/or adapting the drive components to corresponding applications and/or usage scenarios. The drive software and/or parameters can be changed or updated by corresponding updates/upgrades.

The system further has at least one computing unit. The computing unit is in communication with the drive computing unit of the drive component. Communication takes place via a communication interface. The communication interface can be embodied as a fieldbus. A fieldbus is a bus system that connects field devices in a field, for example drive components in an automation system for the purpose of communication with an automation device.

The computing unit is configured to detect an actual operating state of the drive component. The actual operating state represents the currently determined state of the drive component. This can, for example, be detected via sensor signals and via the program sequence of the application currently to be executed. Here, the actual operating state can comprise the operative operating state for executing an application, a waiting state or movement from one state to another state.

According to the detected actual operating state, the computing unit is configured to select at least one service operating state for the drive component. Here, a service operating state represents a specific and known state of the drive component that allows applications to be executed on the drive component without causing damage to the drive component and/or further drive components located in the vicinity of the drive component. In particular, the computing unit is configured to select at least one service operating state for the drive component according to the detected actual operating state and the machine or system context. Machine context should be understood as the knowledge that a machine and/or controller has about the components connected thereto, comprising knowledge about corresponding movements or movements related to specific functions, about operating times and idle times, etc.

The system further has a distributed computing system. The distributed computing system can be embodied as cloud computing. Cloud computing is an IT infrastructure that is available via the Internet. This IT infrastructure includes storage space, computing power or application software. The distributed computing system can be understood as a computer network or as a local stand-alone computer which can be accessed via a communication interface, for example via a wired and wireless network.

The distributed computing system is in communication with the drive computing unit of the drive component and is configured to trigger administration of the drive component according to the selected service operating state of the drive component.

It has been recognized that, in order to execute administration applications via a remote connection, additional specialist personnel with a specific level of knowledge about the machine and/or drive component who also have corresponding authorizations for administration must be present locally, on site at the machine and/or at the drive component. For a simple machine with a low number of drive components, this function can be performed by a single specialist. In a machine park with a large number of drive components, which may have a specific function in relation to one another, the function can no longer be covered by one single specialist or becomes so extensive that administration cannot be executed efficiently. An OEM and/or machine manufacturer can use the present invention to administer drive components, for example install new software, all over the world without the need for a specialist on site at the machine. It is merely necessary to query which machines or drive components have a suitable operating state or service operating state and corresponding upgrades are imported more efficiently and quickly, parameters are changed and/or drive components are configured more quickly and efficiently. Furthermore, test movements can be performed in order to recognize from the behavior of the machine as a whole whether maintenance is necessary.

Advantageously, the present invention prevents the need for additional service personnel for administration, thus eliminating additional waiting times and costs. The service operations can be controlled in a fully automated manner by the cloud applications (apps) or in a partially automated manner by a service expert, for example from the headquarters of an OEM. At most, one machine operator is required on site.

It is furthermore of advantage that the service operations are executed in the machine's programmed waiting times or downtimes and do not impair normal (operative) operation. In the cloud, the time still available in the time window can be used to check whether the scheduled service applications from the cloud can still be completed in an acceptable manner. The releases expire automatically after the expiry of the configured time period, which corresponds to a time window for the administration, thus increasing cyber security.

Moreover, the specification of a defined operating state model for IoT-access (IoT=Internet of Things) to a single drive component allows universal service applications to be programmed in the cloud or an edge box for all drive components regardless of the technological boundary conditions in the system or machine.

The system and the method according to the present invention enable new applications to be executed, comprising, for example, automated security updates, analysis of the current drive behavior and, based thereupon, offers for drive optimization to the operator of the system. Advantageously, no additional specialist personnel have to be deployed on site, which means that the service applications can be executed more efficiently and more cost-effectively.

It is moreover advantageous that a procedure is defined that ensures that there can be no risk to people or machinery.

According to one embodiment, the at least one service operating state comprises a specific and known state of the drive component. The service operating state does not correspond to an operative operating state of the drive component. The specific and/or known state of the drive component includes a state in which the drive component can be manipulated remotely without risk to people and/or further machinery in the access area. For example, a test movement can be triggered which is executed without monitoring the course of the test movement on site in order to reduce the risk of collision. Instead, the service operating state guarantees that a service operation can be released and performed.

According to a further embodiment, administration of the drive component comprises service operations on the drive software for operating the drive component and/or service operations for commissioning/maintaining the drive component. These service operations can be executed during the service operating states. New drive software, for example in the form of firmware updates and/or parameter changes can be made and their functionality can be tested. Moreover, it is possible for certain test movements to be performed for commissioning the new drive software and/or parameter changes can be performed to check the changed properties of the drive components. Moreover, maintenance runs can be performed in order, for example, to identify wear on the machine and/or the drive components. These measures can be executed independently of and without disruption to the operative operating states.

According to a further embodiment, the service operations are queried and provided via the distributed computing system. The distributed computing system, for example a cloud, provides corresponding applications (apps) that are used on the drive components.

According to a further embodiment, the service operating state has (or lasts for) a configurable time period. The configurable time period indicates when there is a change from the service operating state of the drive component to the operative operating state of the drive component. Hence the service operating states can, for example, be placed in the normal operational downtimes of the machine and/or drive component. The service states are selected under program control via the computing unit and are provided with a configurable time period or with a time window. The configurable time period Indicates the time of a state of the drive component before it changes back to the normal and/or operative operating state. The configurable time period can be configured with a different time for each service operating state via the computing unit. Configuration takes place, for example, by analyzing the program sequence, which indicates when a new application occurs and hence there is a change from an idle state to the operative operating state for the drive component.

According to a further embodiment, the computing unit is embodied as a programmable logic control (PLC). According to a further embodiment, the computing unit is embodied as a computerized numerical control (CNC). The computing unit has knowledge of the complete sequence of the program for operating the drive component and can hence provide or define corresponding service operating states with a corresponding time period.

According to a further embodiment, for the service operating state, authentication requirements for access control to the drive computing unit of the drive component are provided via the computing unit and queried by the distributed computing system for access. Advantageously, authentication requirements for the User Management & Access Control system (UMAC) of the drive component can be stored for the different service operating states which are required for the execution of the associated service operation. In this way, it can be guaranteed that only authorized remote controllers and/or service applications have access to the drive component. Protection against unauthorized manipulation is improved. After corresponding authentication, the service operating states and their time period remaining can be queried by the cloud applications and the service operations can be started from the cloud.

According to a further embodiment, user roles are assigned to the authentication requirements. The authentication requirements enable access to the drive computing unit of the drive component according to the role. The user roles can provide different levels of access for remote controllers and applications which allow different depths of access and hence the execution of different changes.

According to a further embodiment, an operational message is output on a display/operating element if the actual operating state of the drive component does not enable selection of a service operating state for the drive component. According to a further embodiment, a change from the operative operating state to the service operating state is effected by selection via an external release signal. If the local machine context still does not permit safe execution of the service operation in the respective service states, it is additionally possible to output and/or display the query for a local and manual release of the service operations in the respective states. For this purpose, an operational message defined in the cloud application can be output via the drive component. The operational message can be output via the display/operating element, for example a touch display, an input panel with an integrated screen and/or a PC or handheld device, which is connected to the drive component and/or the machine. The display/operating element can prompt an operator to set a manual release, for example an external input signal, by actuating a button or a key-operated switch. Releasing the service operating state can increase security.

According to a further embodiment, the distributed computing system has a logging apparatus for logging a state change and/or a service operation. Advantageously, hence, all state changes and operations from the distributed computing system (cloud) can be logged via the logging apparatus so they can be tracked without doubt at any time. In an alternative embodiment, the logging apparatus can be provided in the drive component. In the event of problems occurring, the log can be used to track the state changes made and service operations executed and to check or reset them accordingly to eliminate the problem.

According to a second aspect, the invention relates to a method for administering drive components having a drive computing unit, wherein drive software for operating the drive component that can be executed by the drive computing unit is stored on the drive computing unit. The method comprises the following steps:

detecting an actual operating state of a drive component and selecting at least one service operating state for the drive according to the detected actual operating state component by means of a control computing unit;

administering the drive software for operating the drive component according to the selected service operating state of the drive component by means of a distributed computing system.

In one embodiment, the actual operating state of a drive component and its machine or system context is detected. Hence, advantageously, knowledge of further components and, for example, the movements thereof is available and this can additionally be taken into account in order to select a service operating state. Hence, more precise information Is available.

The above-described embodiment according to the invention of the method according to the second aspect of the invention can also be embodied as a computer program, wherein a computer is prompted to perform the above-described method according to the invention when the computer program is executed on a computer or on a processor of the computer. The computer program can be provided as a signal via download or stored in a memory unit of the computer or the administrator unit with computer-readable program code contained therein in order to prompt an electronic device, for example a server, to execute instructions according to the aforementioned method. In this case, the computer program can also be stored on a machine-readable storage medium. An alternative way of achieving the object provides a storage medium that is intended to store the above-described computer-implemented method in the form of program code and can be read by a computer or processor.

The above embodiments and developments can be combined with one another as desired, insofar as this makes sense. Further possible embodiments, developments and implementations of the invention also comprise combinations that are not explicitly mentioned of features of the invention described above or below with respect to the exemplary embodiments. In particular, the person skilled in the art will also add individual aspects as improvements or additions to the respective basic form of the present invention.

BRIEF DESCRIPTION OF THE DRAWING

The present invention is explained in more detail below with reference to the exemplary embodiments shown in the schematic figures in the drawings, in which.

DETAILED DESCRIPTION OF PREFERRED EMBODIMENTS

Figure 1:
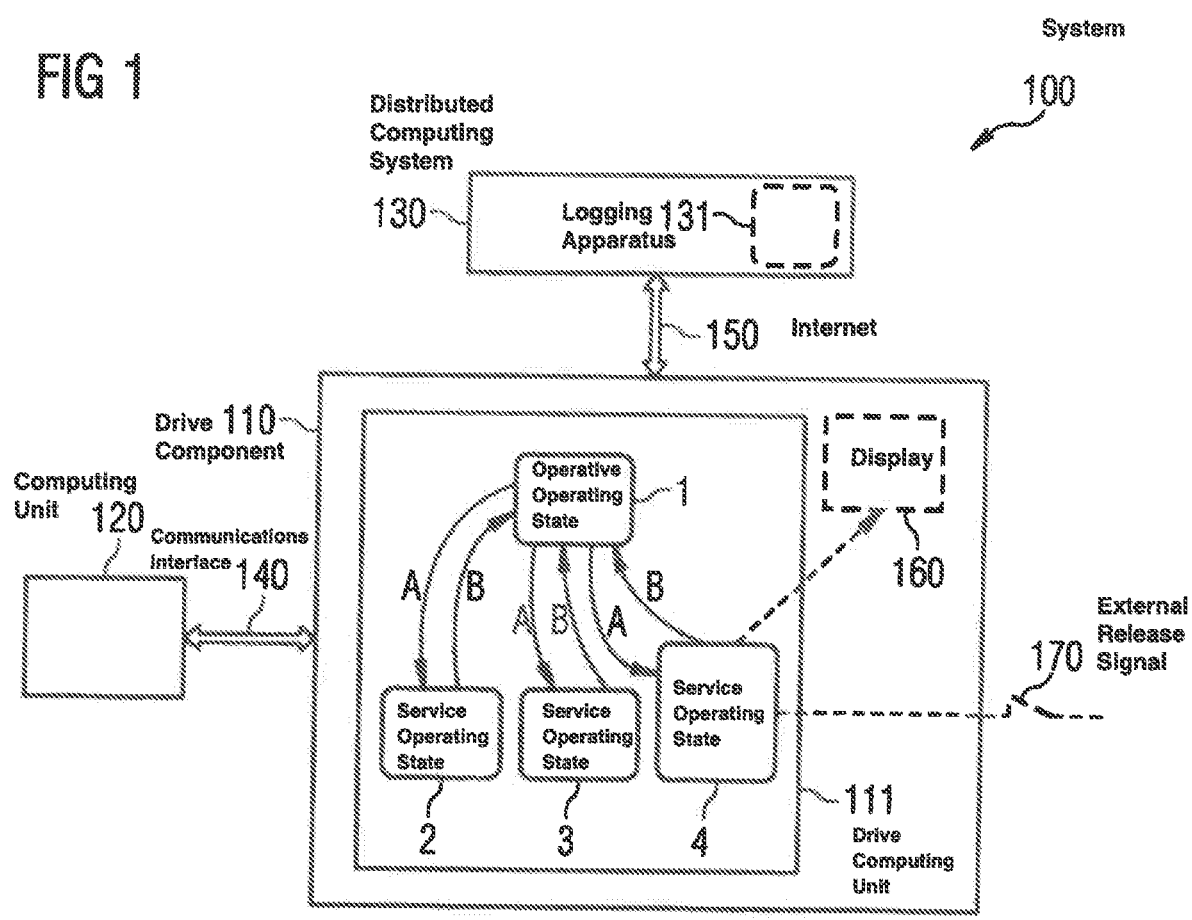
FIG. 1 shows a schematic representation of an embodiment of a system for administering drive components.

The appended drawings are intended to provide further understanding of the embodiments of the invention. They illustrate embodiments and, in connection with the description, serve to explain principles and concepts of the invention. Other embodiments and many of the advantages named will become apparent by reference to the drawings. The elements of the drawings are not necessarily shown true to scale with respect to one another.

Unless otherwise specified, in the figures of the drawing, elements, features and components with the same functions and the same effects, are in each case provided with the same reference characters.

FIG. 1 shows a schematic representation of an embodiment of a system for administering drive components 110. The system 100 comprises at least one drive component 110. The drive component 110 can be a component of a machine of the system 100. In this regard, the system 100 can have a large number of drive components 110 belonging to one or more machines. The drive component 100 can comprise a DC drive or an AC drive. The drive component 110 has a drive computing unit 111, preferably a drive converter for operating the drive component 110. Drive software for operating the drive component 110 that can be executed by the drive computing unit 111 is stored on the drive computing unit 111. The drive computing unit 111 represents a control signal that can be varied in terms of voltage, current and/or frequency for actuating the drive component 110. In one embodiment, the drive component can have a display/operating element 160. The display/operating element 160 can be embodied as a touch panel, operator panel with an input unit, for example a mouse and/or a keyboard and an output unit, for example a monitor. It is furthermore conceivable for the display/operating element 160 to be embodied as a PC or handheld device which communicates with the drive component 110 via a communication interface.

The system 100 furthermore comprises a computing unit 120. The computing unit 120 communicates with the drive component 110 via a communication interface 140. The communication interface 140 can be embodied as a fieldbus. Cyclic communication takes place between the computing unit 120 and the drive component 110. The cyclic communication can, for example, transmit an attribute that defines the operative operating state of the drive component 110. Moreover, the cyclic communication can be used to send an event that prompts a change to a specific state, for example a service operating state 2, 3, 4. A fieldbus advantageously ensures both communication directions with different data. The fieldbus can, for example, be embodied as Ethernet or RS485 as physical layers for communication. Furthermore, implementations such as, for example, Profinet based on Ethernet, Modbus based on RS485 (Modbus RTU) or Ethernet (Modbus/TCP) or Profibus based on RS485 can be provided. The computing unit 120 can be embodied as a programmable logic control or as a CNC controller or as a system control. The computing unit 120 can be implemented as a standalone hardware component or implemented as a software Instance on a computer or hosted in the cloud.

In this regard, the computing unit 120 can be embodied as a computing unit with a volatile and/or non-volatile memory, at least one processor and communication interfaces for communication with the drive component 110. The computing unit 120 can further have communication interfaces for communication with further devices, for example for operation. The communication interfaces can be embodied for wired and/or wireless communication.

The computing unit 120 is used to select corresponding service operating states under program control and provide them with a configurable time period for execution. The configurable time period indicates when the drive component 110 changes back to the operative operating state. For this purpose, corresponding sensor data of the drive component 110 that detects a corresponding position of the drive component can be evaluated. Furthermore, corresponding actuation signals and the program sequence for actuating the drive component 110 can be analyzed to determine corresponding service operating states 2, 3, 4 and to configure them with a time period. The activation of the service operating states 2, 3, 4 can be inserted in the program sequence of the computing unit 120 based on knowledge of the entire machine context. The configuration of the time period comprises specifying the time available for executing a service operation in each specific service operating state 2, 3, 4. Each service operation requires a specific time period which must be compared with the configured time period that is actually available. If the time period for executing a service operation is greater than the configurable time period available in a service operating state 2, 3, 4, the service operation cannot be executed in this service operating state 2, 3, 4.

The system 100 furthermore comprises a distributed computing system 130. The distributed computing system 130 can be embodied as a cloud consisting of a computer network which is connected to the drive component 110 via the Internet 150. In an alternative embodiment, the distributed computing system 130 can be embodied as a computer that is installed locally on site and communicates with the drive component 110 via a corresponding network 150.

In one embodiment, the distributed computing system 130 comprises a logging apparatus 131. The logging apparatus 131 is embodied to log the state changes and the service operations executed from the cloud so they can be tracked without doubt at any time.

Service operations are provided via the distributed computing system 130. Before these service operations are provided or queried, authentication information must be exchanged between the distributed computing system 130 and the drive component 110. In this regard, cyber security can be improved. The service operation to be executed on the drive component 110 queries corresponding service operating states 2, 3, 4 and the configured time period of the service operating states 2, 3, 4 for execution. The service operating states 2, 3, 4 can be used to ensure that the drive component 110 is not in the operative operating state 1 in which people and/or machinery could be endangered. The configured time period defines how long the service operating state 2, 3, 4 is available. Hence, the service operation can determine whether the execution of the service operation can be successfully completed in the available service operating state 2, 3, 4. If the available configured time period is too short, execution of the service operation is precluded. If service operating states 2, 3, 4 are required and available, transmission of the service operations via the communication interface 150, for example the Internet (IoT) or Ethernet is initialized via the distributed computing system 130. Moreover, the execution of the service operation is monitored and analyzed if necessary.

FIG. 1 depicts a large number of exemplary states 1, 2, 3, 4 of the drive component 110. Reference character 1 denotes the operative operating state of the drive component 110 which represents the normal state in which, for example, the drive component 110 is moved. Reference character 2 denotes a first exemplary service operating state. The operating state 1 can be selected via the fieldbus 140 by the computing unit 120, for example a PLC, via an action A. The service operating state 2 can comprise release for a firmware update. The service operating state 2 can, for example, comprise release for a firmware update of the drive computing unit 111. Moreover, an authentication code is provided which must be confirmed by the service operation for the firmware to be updated. In this embodiment, the authentication code would indicate what rights an application in the distributed computing system 130 must have in order to execute the firmware update. The distributed computing unit system 130 would have to identify itself to the drive component 110 with these rights. Moreover, a configured time period of 5 minutes is specified for the service operating state 2, for example. Within this time period, it can be guaranteed that the drive component 110 is in a specific and known state in which the firmware update can be executed. An action B can be used to deselect the service operating state 2. This can take place automatically when the configured time period has expired or by deselection via the fieldbus.

Reference character 3 denotes a further exemplary service operating state. The service operating state 3 can be selected via an action A, for example by selection via the fieldbus. In the service operating state 3, the changes to regulatory parameters of the drive component 110 can be released. Release for changing the regulatory parameters via a service operation is given after the corresponding input of an authorization code. For the execution of the regulatory parameter change, a configured time period of 6 minutes can be provided via the computing unit 120 for the service operating state 3 before the drive component 110 changes B from the service operating state 3 to the operative operating state 1. Moreover, the change B can take place by deselection via the fieldbus.

Reference character 4 denotes a further exemplary service operating state. The service operating state 4 can be selected via an action A, for example by selection via the fieldbus. In the service operating state 4, a test movement of the drive component 110 can be released. Release for changing the regulatory parameters via a service operation is given after the corresponding input of an authorization code. For the execution of the test movement, a configured time period of, for example, 10 minutes can be provided via the computing unit 120 for the service operating state 4. To ensure the safety of people and machinery, an operational message for manual consent of the execution of the test movement can be output via the display/operating element. The required manual consent can be provided via an external release signal 170 such as a manual release signal by an operator or alternatively via a release signal transmitted by a fieldbus.

Figure 2:
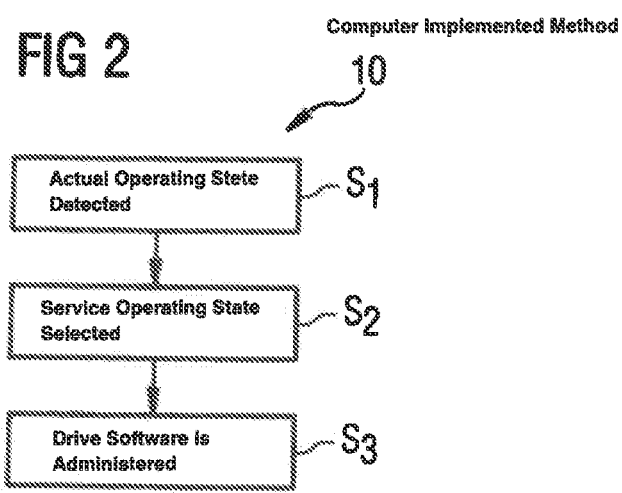
FIG. 2 shows a flow chart according to one embodiment of the method according to the invention.

FIG. 2 shows a flow chart according to one embodiment of the computer-implemented method 10 according to the Invention. In the embodiment depicted, the method 10 comprises several steps. In a first step S1, an actual operating state of a drive component 110 is detected. In a further step S2, at least one service operating state 2, 3, 4 for the drive component 110 is selected S2 by a computing unit 120 according to the detected actual operating state. In a further step S3, the drive software for operating the drive component 110 according to the selected service operating state 2, 3, 4 of the drive component 110 is administered by a distributed computing system 130.

In one exemplary embodiment, a test movement of a drive component 110 is to be executed to diagnose the behavior of a machine. This exemplary embodiment does not represent a limitation of the method according to the invention, but is intended to illustrate it in a practical application. The test movement is subject to the following requirements. The test movement can be executed purely for machine diagnosis or as the basis for the subsequent optimization of certain regulatory parameters. Here, the drive component 110 should execute a defined test movement. The data generated in the process for the defined test movement is stored in a memory unit in the drive component 110 or in an external memory unit. The drive component 110 performs a defined test movement free from other machine parts. There must be no danger to people or machinery during the defined test movement. To perform the test movement, the drive component 110 must not be in the operative operating state 1 so that its normal operation is not impaired. Any scheduled operative operations or operating states should not be delayed. The process of the test movement should take place in a fully automated manner and be defined from the distributed computing system 130, for example the cloud. For this purpose, an application (app) in the cloud decides which movement is executed, which values are measured and how the data obtained is subsequently processed.

Whenever the computing unit 120 determines that the drive component 110 is not required for a certain period of time, for example because the machine is waiting for a new workplace or a respective drive axle is not in use, the computing unit 120, for example a system controller, PLC, CNC controller, reports this to the drive component 110 via a communication interface, for example a fieldbus. These applications can be defined by a machine specialist during commissioning. An exemplary message can be embodied as follows:

the state's scheduled time period;
a description of the permissible applications, for example wilting parameters, moving the drive component 110 within certain limits, downloading a new configuration in the drive component 110, upgrading the firmware of the drive component 110 (drive computing unit 111) or the rights granted to a potential user from the cloud;
an authorization code that indicates which user roles are allowed to use a specific service operating state, for example OEM service, Siemens service.

The computing unit 120 can generate this message based on its knowledge of the entire machine state. The drive component 110 is unable to do this itself because it does not know the entire machine context. The drive component 110 receives this message and enters a sub-state (service operating state). This comprises the drive component 110 remaining in control and ready to relinquish command authority to a cloud application (app). The drive component 110 reports this to the distributed computing system 130 (cloud). The cloud application receives the message from the drive component 110. From the history of the last service interval, the cloud app can decide that a machine diagnosis should be carried out again and that the time available is sufficient and takes over command authority over the drive component 110 or the drive. The cloud app issues commands to the drive component 110 which specify the type of test movement and select the signals to be recorded. The test movement is then triggered. At this point, it is also conceivable for a local specialist (on site at the drive component 110) to query an additional consent input. The drive component 110 executes the test movement and records a selection of signal sources. After the expiry of the time window (configured time period), the drive component 110 automatically returns to the operative operating state 1 (prior to the message from the computing unit 120). The recorded data can be transmitted to the cloud and stored in the background during ongoing operation. An application in the cloud evaluates the recorded data.

In summary, the invention relates to a system and a method for administering drive components 110. The system comprises at least one drive component 110 having a drive computing unit 111. Drive software for operating the drive component 110 that can be executed by the drive computing unit 111 is stored on the drive computing unit 111. Furthermore, the system has a computing unit 120 in communication with the drive computing unit 111 of the drive component 110. The computing unit 120 is configured to detect an actual operating state of the drive component 110 and its machine or system context and to select at least one service operating state 2, 3, 4 for the drive component 110 according to the detected actual operating state 1. Moreover, the system comprises a distributed computing system 130 in communication with the drive computing unit 111 of the drive component 110, which is configured to trigger administration of the drive component 110 according to the selected service operating state 2, 3, 4 of the drive component 110.

A process to be maintained can thus be defined which ensures that operative operation cannot be impaired and people or machinery cannot be endangered during administration.

The invention claimed is:

1. A system for administering drive components, said system comprising:
a drive component having a drive computing unit;
drive software for operating the drive component, said drive software executed by the drive computing unit and stored on the drive computing unit;
a computing unit in communication with the drive computing unit of the drive component, said computing unit configured to detect an actual operating state of the drive component and to select at least one service operating state for the drive component according to the detected actual operating state, wherein each service operating state has a corresponding configurable time period indicating when there is a change from the at least one service operating state of the drive component to the operative operating state of the drive component and the selected at least one service operating state comprises a specific and known state of the drive component, said at least one service operating state not corresponding to an operative operating state of the drive component, wherein said at least one service operating state guarantees that a service operation can be released and performed; and
a distributed computing system in communication with the drive computing unit of the drive component, said distributed computing system configured to trigger administration of the drive component according to the selected service operating state of the drive component by operating the drive component in the selected at least one service operating state of the drive component and executing a service operation during the selected at least one service operating state for the corresponding configurable time period, and changing the drive component from the selected at least one service operating state to the operative operating state upon expiration of the configurable time period.

2. The system of claim 1, wherein the service operations comprise drive software for operating the drive component and/or service operations for commissioning/maintaining the drive component.

3. The system of claim 2, wherein the service operations are queried and provided via the distributed computing system.

4. The system claim 1, wherein the computing unit is embodied as a programmable logic control (PLO) or as a computerized numerical control (CNC).

5. The system of claim 1, wherein authentication requirements for access control to the drive computing unit of the drive component for the at least one service operating state are provided via the computing unit and queried by the distributed computing system for access.

6. The system as claimed in claim 5, wherein user roles that enable access to the drive computing unit of the drive component according to the user role are assigned to the authentication requirements.

7. The system of claim 1, wherein an operational message is output on a display/operating element when the actual operating state of the drive component does not enable selection of the at least one service operating state for the drive component.

8. The system of claim 1, wherein a change from the operative operating state to the at least one service operating state is effected by selection via an external release signal.

9. The system of claim 1, wherein the distributed computing system has a logging apparatus for logging a state change and/or a service operation.

10. A method for administering drive components having a drive computing unit, wherein drive software for operating a drive component and executed by the drive computing unit is stored on the drive computing unit, said method comprising:
detecting an actual operating state of the drive component;
selecting at least one service operating state for the drive component according to the detected actual operating state by a computing unit, wherein each service operating state has a corresponding configurable time period;
administering, by a distributed computing system, the drive software by operating the drive component in the selected at least one service operating state of the drive component and executing a service operation during the selected at least one service operating state for the corresponding configurable time period, wherein the selected at least one service operating state comprises a specific and known state of the drive component, said at least one service operating state not corresponding to an operative operating state of the drive component, wherein the selected at least one service operating state guarantees that the service operation can be released and performed; and changing the drive component from the selected at least one service operating state to the operative operating state upon expiration of the configurable time period.

11. A computer program product embodied in a non-transitory computer readable medium comprising program code for executing a method as set forth in claim 10 when the computer program is executed on the drive computing unit.

\* \* \* \* \*